Figure 1:
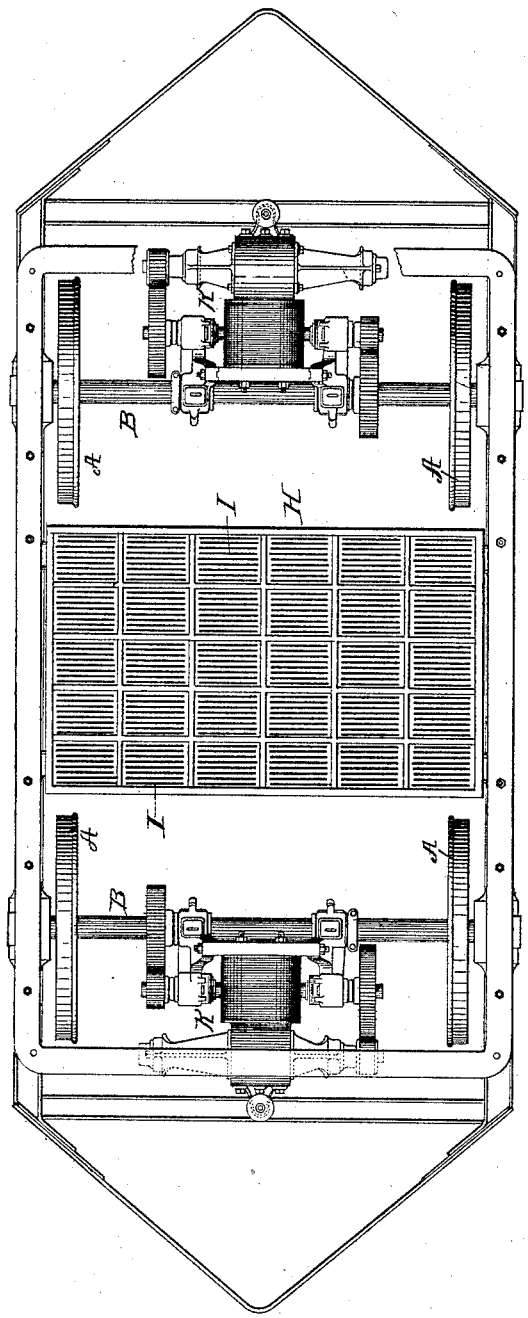

(No Model.)

2 Sheets—Sheet 1.

F. J. SPRAGUE.
ELECTRIC RAILWAY CAR.

No. 413,151. Patented Oct. 15, 1889.

Witnesses
M. B. Dodge
William —

Inventor
Frank J. Sprague
By his Attorneys

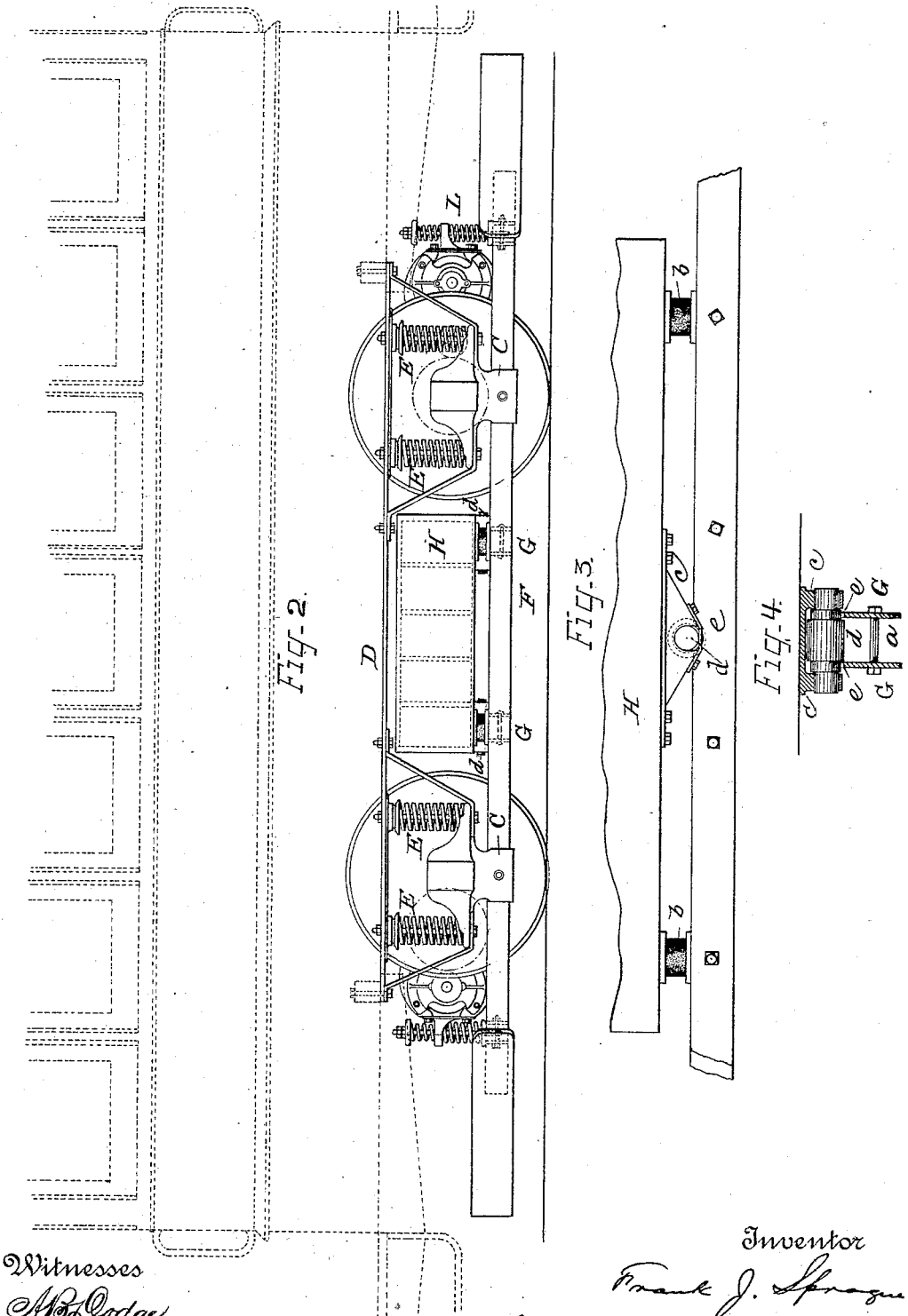

UNITED STATES PATENT OFFICE.

FRANK J. SPRAGUE, OF NEW YORK, N. Y., ASSIGNOR TO THE SPRAGUE ELECTRIC RAILWAY AND MOTOR COMPANY, OF SAME PLACE.

ELECTRIC-RAILWAY CAR.

SPECIFICATION forming part of Letters Patent No. 413,151, dated October 15, 1889.

Application filed July 5, 1889. Serial No. 316,574. (No model.)

*To all whom it may concern:*

Be it known that I, FRANK J. SPRAGUE, a citizen of the United States, residing at New York, in the county and State of New York, have invented a certain new and useful Improvement in the Propulsion of Cars by Secondary Electric Batteries, of which the following is a specification.

My invention relates to the mode of supporting secondary batteries upon railway-cars for the purpose of propelling the same, and also to the arrangement of the electric motors relative to such batteries. Heretofore when secondary or storage batteries have been used for this purpose they have been placed upon or within the body of the car, and usually under the seats within the car. This arrangement has many objections, the principal one being that the great weight of the battery-cells bearing on the springs which support the car-body injures such springs, depresses the car-body, and prevents the easy motion of the car-body on its springs. Furthermore, the placing of the cells under the seats makes it necessary to make the seats wider, and so make the aisle narrower, makes a change in the shape of the car-body necessary, requires such car-body to be heavier and stiffer in construction, and the floor to be made stronger, and movable panels to be used at the sides of the car. It is required, in order to place the batteries into position and remove them, that the car shall be run alongside a platform; also, the presence of the cells containing acid in the car is inconvenient and may be dangerous to the passengers in case of accident to the car. It has been proposed to place the batteries on the roof of the car or on the platforms; but while some of the objections above mentioned may be obviated in this way, those which relate to the placing of the weight of the batteries on the body of the car will still exist, and other obvious inconveniences arise.

The object of my invention is to avoid these objections, and to so arrange and support the battery-cells that they shall be independent of the car-body, so that the car-springs shall not be affected by them; so that the cells shall be conveniently accessible and can be readily removed and replaced at any time, although at the same time they are entirely out of the way, and so that they shall have the minimum of movement due to the jolting and swaying of the car. I also arrange the motors so that their weight and that of the battery-cells shall be evenly distributed.

In carrying my invention into effect I place the battery-cells underneath the body of the car and support them primarily from the axles, the support being upon a frame joining the axles, and the batteries being preferably carried upon this frame at the center of the truck, where there is the minimum movement. Such frame preferably consists of the equalizing-bars, which are made to extend from one vertically-movable axle-box to the other on each side, and which may be joined by cross-bars or a cross-frame at the middle of the truck to form the immediate support for the cells. On such support the cells are carried through rubber cushions or other flexible supporting devices. The frame for carrying the cells is so arranged that the box containing the cells may be readily pushed into position and held there and readily withdrawn therefrom. The cells being placed at the middle part of the truck between the axles, I prefer to place two motors, also flexibly supported on the equalizing-bars, one at each end of the truck and outside the axle to which it is geared.

My invention is illustrated in the accompanying drawings.

Figure 1 is a top view of a truck embodying my invention; Fig. 2, a side view of the same with the car-body illustrated in dotted lines; Fig. 3, an end view of a portion of a battery-box and its immediate support; and Fig. 4, a side view, partly in section, of one of the rollers of the box and the parts which support it.

A A are the wheels of the street-car truck; B B, the axles; and C C the vertically-sliding axle-boxes.

D is the upper frame of the truck to which the car-body is directly attached, such frame being supported on springs E E.

On each side of the car there extends from one axle-box to the other a bar F, and between the axles or at the middle part of the truck these bars are joined by a frame, which consists of two pairs of cross bars or rails G, which may be connected by bolts a, and which form the immediate support for the box H, which contains the battery-cells I, of which there may be any suitable number. Upon each pair of cross-rails G are placed two rubber cushions b. At each end of the box is placed a hanger c, provided with bearings for the ends of the roller d, adapted to roll on the rails G. Each rail G is provided at its middle part with a notch e. The box H is pushed in at the side of the car, the rollers being lifted over the cushions b and rolling on the rails G until they reach the notches e, when the rollers drop into such notches and the weight of the box is placed on the cushions b, while the engagement of the rollers with the notches prevents the box from sliding out at the side under the motors of the car. Electric motors K K are provided, each of these being supported at one end on a spring L from the equalizing-bars F, and sleeved at its other end on the axle B, to which its armature-shaft is geared. It will be seen that by this arrangement the weight of the cells and motors is equally distributed throughout the length of the truck, and that the cells themselves are placed at the point where they will have the least movement; that said cells and said motors are independently flexibly supported, so that neither is affected by the movements of the other; that said cells are entirely independent of the car-springs and of the body of the vehicle; that they are readily placed in position and removed therefrom, and when in position are out of the way of the passengers, and that no change is required in the construction of the car whatever.

Suitable electrical connections are made from the battery-cells to the motors, as will be readily understood.

What I claim is—

1. The combination, with a railway-car, of secondary batteries supported independently of the body of the car, substantially as set forth.

2. The combination of a railway-car truck, a car-body supported thereby, and secondary batteries supported by the truck beneath the car-body and independent thereof, substantially as set forth.

3. The combination of a railway-car truck, a car-body carried thereby, and secondary batteries carried by the axles of the truck independently of the car-body, substantially as set forth.

4. The combination of a railway-car truck, a car-body carried thereby, a frame joining the axles of the truck, and secondary batteries carried by said frame, substantially as set forth.

5. The combination of a railway-car truck having vertically-movable axle-boxes and secondary batteries supported by said axle-boxes independently of the car-body, substantially as set forth.

6. The combination of a railway-car truck having vertically-movable axle-boxes and equalizing-bars joining the axle-boxes on each side, and secondary batteries supported by said equalizing-bars, substantially as set forth.

7. The combination, with a railway-car truck having rails or bars extending across it beneath the car-body, of secondary batteries supported upon said rails or bars, substantially as set forth.

8. The combination of a railway-car truck, a car-body carried thereby, and secondary batteries flexibly supported on said truck beneath the car-body, substantially as set forth.

9. The combination of a railway-car truck, a car-body carried thereby, a frame joining the axles of the truck, and secondary batteries and an electric motor carried by said frame, substantially as set forth.

10. The combination of a railway-car truck, a car-body carried thereby, and secondary batteries and an electric motor independently flexibly supported by said truck, substantially as set forth.

11. The combination of a railway-car truck having vertically-movable axle-boxes, a frame joining the axle-boxes, and secondary batteries and an electric motor independently flexibly supported by said frame, substantially as set forth.

12. The combination of a railway-car truck having vertically-movable axle-boxes, equalizing-bars joining the axle-boxes on each side of the truck, cross bars or rails connecting said equalizing-bars at or near the middle of the truck, and secondary batteries supported on said cross bars or rails, substantially as set forth.

13. The combination of a railway-car truck having vertically-movable axle-boxes, equalizing-bars joining the axle-boxes on each side of the truck, cross bars or rails connecting said equalizing-bars at or near the middle of the truck, and secondary batteries flexibly supported on said cross bars or rails, substantially as set forth.

14. The combination of a railway-car truck having vertically-movable axle-boxes, equalizing-bars joining said axle-boxes on each side of the truck, and secondary batteries and an electric motor supported by separate cross-pieces from said equalizing-bars, substantially as set forth.

15. The combination of a railway-car truck having vertically-movable axle-boxes, equalizing-bars joining said axle-boxes on each side of the truck, and secondary batteries and an electric motor independently flexibly supported upon cross-pieces from said equalizing-bars, substantially as set forth.

16. The combination, with a railway-car truck, of electric motors and secondary batteries located beneath the car-body, the batteries counterbalancing the weight of the motors to effect an even distribution of weight, substantially as set forth.

17. The combination of a railway-car truck, a frame joining the axles of said truck, and secondary batteries and electric motors supported by said frame and distributed thereon, so that a portion of the weight of said batteries and motors is at the middle part of the frame and a portion at each end of the frame, substantially as set forth.

This specification signed and witnessed this 18th day of June, 1889.

FRANK J. SPRAGUE.

Witnesses:
 WILLIAM PELZER,
 D. H. DRISCOLL.